(12) United States Patent
Soong et al.

(10) Patent No.: US 11,347,512 B1
(45) Date of Patent: May 31, 2022

(54) SUBSTITUTION THROUGH PROTOCOL TO PROTOCOL TRANSLATION

(71) Applicant: International Business Machines Corporation, Armonk, NY (US)

(72) Inventors: Christine Soong, Poughkeepsie, NY (US); Michael James Becht, Poughkeepsie, NY (US); Raymond Wong, Dutchess, NY (US); Mushfiq Us Saleheen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/166,297

(22) Filed: Feb. 3, 2021

(51) Int. Cl.
*G06F 9/38* (2018.01)
*G06F 13/38* (2006.01)
*G06F 12/0875* (2016.01)
*G06F 13/20* (2006.01)

(52) U.S. Cl.
CPC ........ *G06F 9/3836* (2013.01); *G06F 12/0875* (2013.01); *G06F 13/20* (2013.01); *G06F 13/382* (2013.01); *G06F 13/387* (2013.01)

(58) Field of Classification Search
None
See application file for complete search history.

(56) References Cited

U.S. PATENT DOCUMENTS

| | | | | |
|---|---|---|---|---|
| 6,092,139 A * | 7/2000 | Crane, Jr. | ............... | G06F 1/184 710/307 |
| 7,131,077 B1 * | 10/2006 | James-Roxby | ......... | G06F 30/34 716/103 |
| 7,412,553 B2 * | 8/2008 | Morrow | ................. | G06F 13/387 710/105 |
| 7,412,588 B2 * | 8/2008 | Georgiou | .............. | G06F 15/167 712/33 |
| 7,484,022 B1 * | 1/2009 | Yin | ......................... | H04L 12/56 370/419 |

(Continued)

FOREIGN PATENT DOCUMENTS

| | | | |
|---|---|---|---|
| CN | 101788931 A | * | 7/2010 |
| CN | 105389283 A | * | 3/2016 |
| TW | 576057 B | * | 2/2004 |

OTHER PUBLICATIONS

English Machine Translation of Taiwan Patent Application TW 576057 B, published Feb. 11, 2004. (Year: 2011).*

(Continued)

*Primary Examiner* — Steven G Snyder

(74) *Attorney, Agent, or Firm* — Cantor Colburn LLP; Edward Wixted

(57) ABSTRACT

Aspects of the invention include receiving a request for data. The request is received from a computing element implementing a first bus protocol, and the data is accessible via a reduced instruction set computer (RISC) system implementing a plurality of bus protocols. A type of the received request is determined. A bus protocol is selected from the plurality of bus protocols based at least in part on the type of the received request. The received request is translated into a format that is compatible with the selected bus protocol and transmitted to the RISC system. Data is received from the RISC system in response to transmitting the translated request.

17 Claims, 6 Drawing Sheets

(56) References Cited

U.S. PATENT DOCUMENTS

| | | | |
|---|---|---|---|
| 7,949,806 B2 * | 5/2011 | Jones | G06F 13/387 |
| | | | 710/36 |
| 8,036,243 B2 * | 10/2011 | Georgiou | G06F 15/7832 |
| | | | 370/467 |
| 8,811,422 B2 * | 8/2014 | Georgiou | G06F 15/7832 |
| | | | 370/466 |
| 10,353,767 B2 | 7/2019 | Gianisis et al. | |
| 10,768,916 B2 | 9/2020 | Drepper | |
| 10,771,090 B2 | 9/2020 | Goyal et al. | |
| 10,798,223 B2 | 10/2020 | Sindhu et al. | |
| 2005/0182881 A1 * | 8/2005 | Chou | G06F 13/385 |
| | | | 710/301 |
| 2006/0015673 A1 * | 1/2006 | Morrow | G06F 13/387 |
| | | | 710/315 |
| 2007/0130409 A1 * | 6/2007 | Matsuse | G06F 13/28 |
| | | | 710/308 |
| 2020/0265398 A1 | 8/2020 | Lembo | |

OTHER PUBLICATIONS

'This Project is Creating Linux Laptops Based on PowerPC—It's FOSS' by John Paul, Jun. 27, 2019. (Year: 2019).*

Xilinx 'OPB to DCR Bridge (v1,00b)' Apr. 24, 2009. (Year: 2009).*

\* cited by examiner

SUBSTITUTION THROUGH PROTOCOL TO PROTOCOL TRANSLATION

BACKGROUND

The present invention generally relates to programmable computing systems, and more specifically, to programmable computing systems configured for facilitating substitution through a protocol to protocol translation.

Computing devices communicate with each other via input/output elements to transfer information from one device to another device. Each device's communication is governed by a communication protocol, which defines the format and rules for receiving and transmitting data. Each device's communication protocol is implemented by the hardware and software associated with the device. Each device uses its implemented protocol to authenticate each incoming transmission, regulate a format of the transmission, and enable a response to the transmission.

SUMMARY

Embodiments of the present invention are directed to substitution through a protocol to protocol translation. A non-limiting example of a computer-implemented method includes receiving a request for data. The request is received by a computing element implementing a first bus protocol, and the data is accessible via a reduced instruction set computer (RISC) system implementing a plurality of bus protocols. A type of the received request is determined. A bus protocol is selected from the plurality of bus protocols based at least in part on the type of the received request. The received request is translated into a format that is compatible with the selected bus protocol and transmitted to the RISC system. Data is received from the RISC system in response to transmitting the translated request.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for permitting a PowerPC system to communicate with a processor implementing a RISC-V instruction set architecture, by translating a bus protocol associated with the RISC-V architecture to a bus protocol associated with the PowerPC system.

A central processing unit (CPU) is governed by an instruction set architecture (ISA), which is a format for instructions that define how the CPU engages with software. An ISA specifies addressing modes, bus protocols, instructions, native data types, registers, memory architecture, interrupt and exception handling, and external input/output (I/O) components of the CPU. For example, a CPU can employ a reduced instruction set computer (RISC) (e.g., RISC-V) architecture, which is an open standard ISA based on established RISC principles. However, in some instances, the CPU may be incompatible with another RISC device (e.g., PowerPC) because the devices implement incompatible bus protocols. For example, a PowerPC system cannot directly communicate with a RISC-V processor because they employ incompatible bus protocols. The PowerPC system uses a processor local bus (PLB) protocol and a device control register (DCR) protocol, which are incompatible with a TileLink protocol, which is used by the RISC-V processor.

One or more embodiments of the present invention address one or more of the above-described shortcomings by providing computer-implemented methods, computing systems, and computer program products that can substitute a CPU implementing a RISC-V ISA for a CPU that implements a PowerPC ISA. The substitution is performed by a bridge that translates the incoming and outgoing data of the CPU implementing the RISC-V ISA to be compatible with the CPU that implements the PowerPC ISA.

Figure 1:
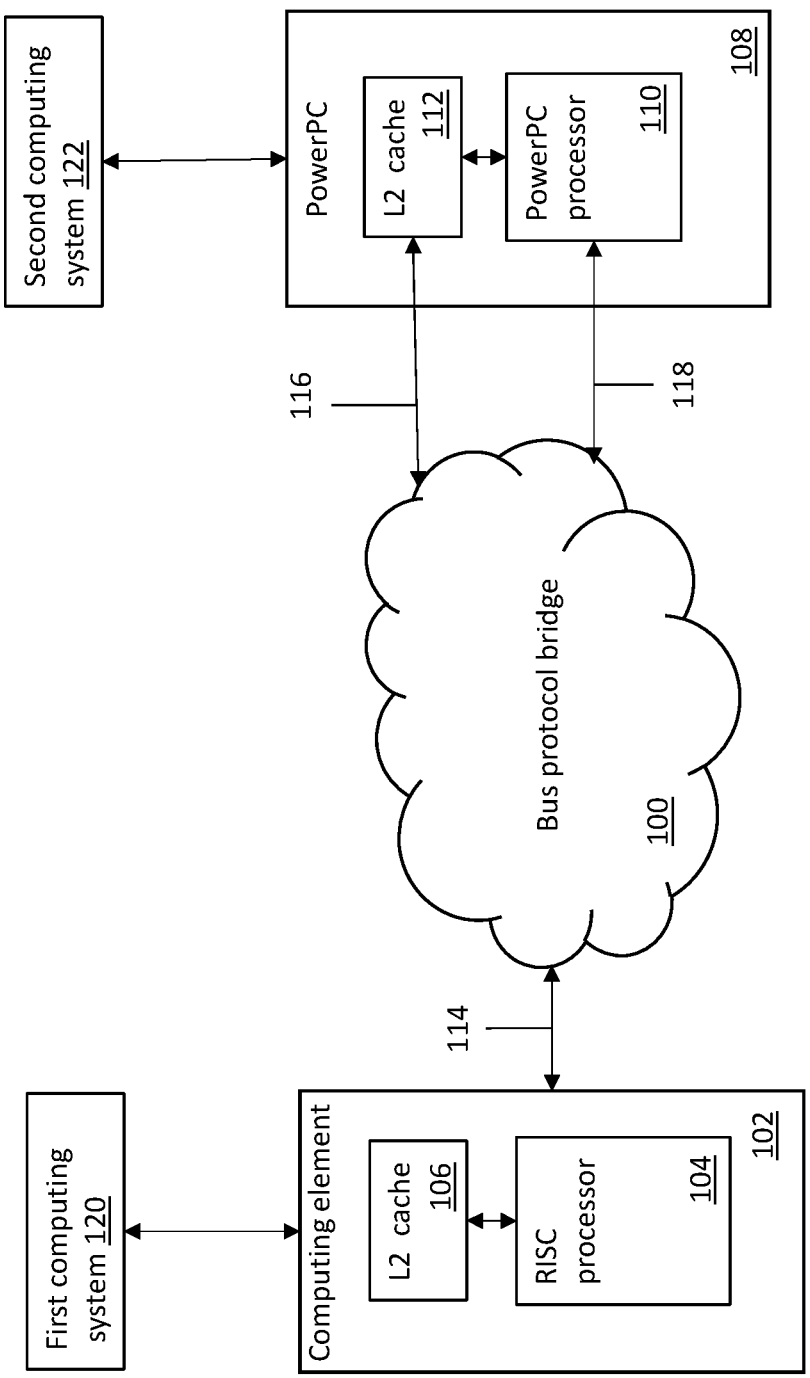
FIG. 1 illustrates a block diagram of components of a system for substitution through a protocol to protocol bus translation in accordance with one or more embodiments of the present invention.

Turning now to FIG. 1, a bus protocol bridge system 100 (hereinafter the "system") is generally shown in accordance with one or more embodiments of the present invention. The system 100 is in operable communication with a computing element 102 via a first bus 114. The computing element 102 includes a processor 104 that implements a RISC-V ISA (hereinafter, "RISC-V processor"), and a first level 2 (L2) cache 106. The L2 cache 106 is a storage device that is arranged separately from the RISC-V processor 104. The system 100 is also in operable communication with a PowerPC system 108 via a second bus 116 and a third bus 118. The PowerPC system 108 includes a processor 110 that implements a PowerPC ISA (hereinafter "PowerPC processor"), and a second L2 cache 112. The computing element 102 is further in operable communication with a first computing system 120, and the PowerPC system 108 is further in operable communication with a second computing system 122. It should be appreciated that all or a portion of the system 100 can be implemented by a computing apparatus, for example, the computer system 600 of FIG. 6 and/or a cloud computing node 10 of FIG. 4.

The computing element 102 can implement a TileLink protocol to communicate with the system 100. TileLink is a chip-scale interconnect standard for implementing a cache coherence policy for the computing element 102. TileLink operates via five transaction channels, including A, B, C, D, and E, which can flow through the first bus 114. Channel A carries request messages for a cache block. Channel B carries request messages for a particular cached block. Channel C carries responses to requests made through channel B. Channel C can also be used to voluntarily writeback dirtied data. Channel D carries messages in response to a request made through channel A. Channel D can also be used for acknowledgments for the Channel C writebacks. Channel E carries acknowledgments of receipts of messages carried through channel D.

Channels A and D and are mandatory and can be used for both a TileLink uncached lightweight (TL-UL) channel and a TileLink uncached heavyweight (TL-UH) channel. There are two types of operations available through a TL-UL channel, reading data from memory and writing data to memory. The TL-UH channel is used for an outermost cache layer, in which no permissions are required. The TL-UH channel can be used to atomically read and return data values while simultaneously writing a data value, assist with performance optimization, and allow burst data messages. Channels B, C, and E are used for TileLink cached (TL-C) channels and permit copies of blocks of shared data to be cached. The TL-C channels can be used to create or remove cached copies of data blocks.

The PowerPC system 108 uses a processor local bus (PLB) protocol and a device control register (DCR) protocol. The PLB protocol and the DCR protocol manage transfers of data to and from the PowerPC system 108. The DCR protocol permits data transfer to be independent of any PLB data transfers. The PLB protocol and the DCR protocol are incompatible with the TileLink protocol. In particular, the physical ports used with the PLB protocol and the DCR protocol are different than the physical ports used with the TileLink protocol. The timing and behavior of the signals required by the PLB protocol and the DCR protocol are different than the timing and behavior of the signals required by the TileLink protocol. Furthermore, the TileLink protocol uses different opcodes and bit encoding than the PLB bus protocol and the DCR protocol.

Figure 2:
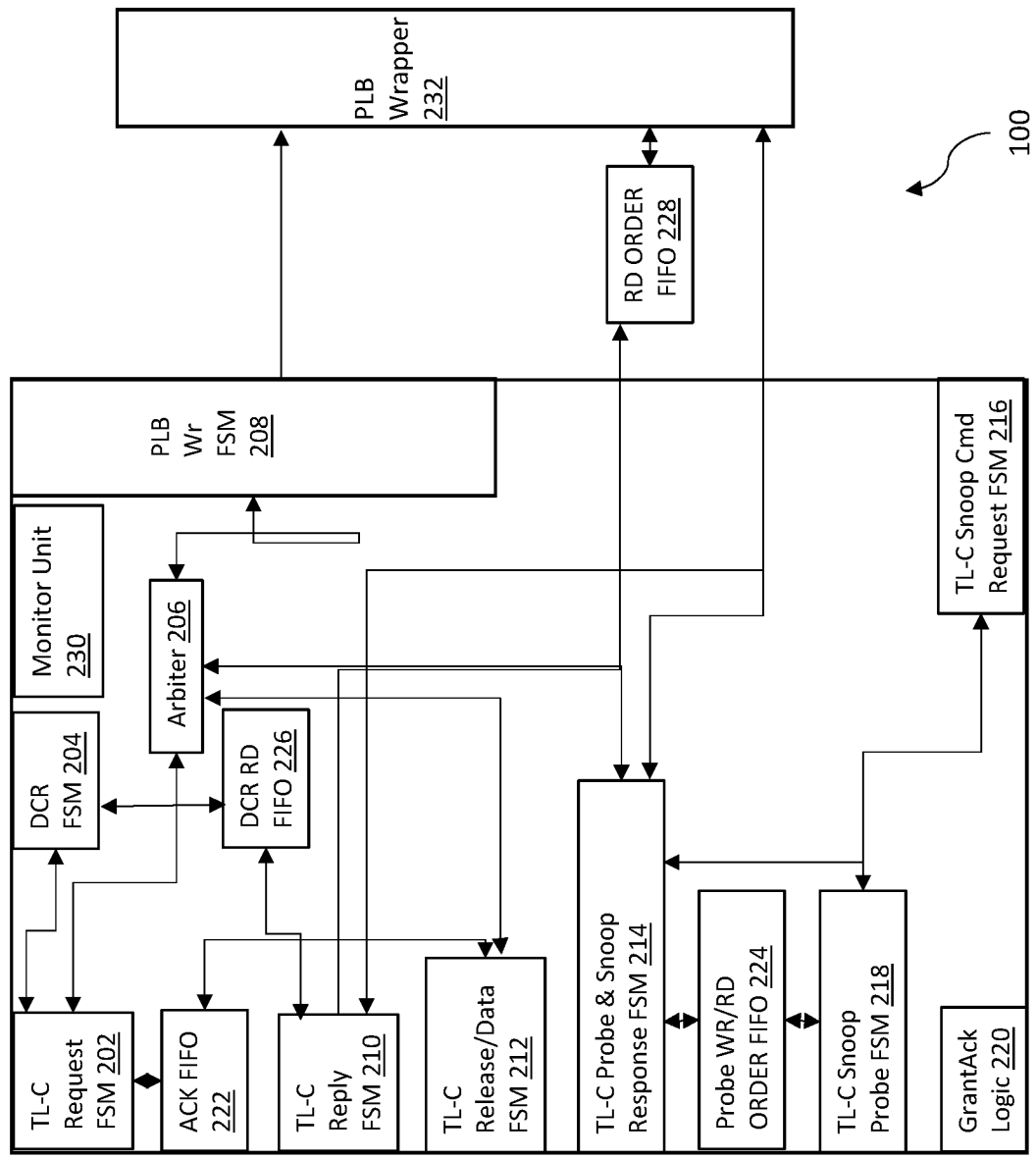
FIG. 2 illustrates a block diagram of components of a bus protocol bridge in accordance with one or more embodiments of the present invention.

Referring to FIG. 2, the bus protocol bridge system 100 of FIG. 1 is generally shown in accordance with one or more embodiments of the present invention. A TileLink cached (TL-C) request finite state machine (FSM) 202 can receive an input message from computing element 102 of FIG. 1 via channel A of the first bus 114. The input message can include an opcode, a base register address, an index register address, a displacement register address, and the target register address. The TL-C request FSM 202 receives the input message, determines a state of the request, any conditions associated with the request, to whom the request is directed, and the nature of the request. In particular, the TL-C request FSM 202 receives the components of the input message and outputs a message state. Based on the state, the TL-C request FSM 202 outputs a determination as to whether the message's destination is the second L2 cache 112 of the PowerPC 108 of FIG. 1 and/or the PowerPC processor 110 of the PowerPC of FIG. 1. For example, the TL-C request FSM 202 can access a table of states, in which each listed state is associated with a destination. The TL-C request FSM 202 can compare an outputted state with a matching entry in the table and retrieve the associated destination.

The TL-C request FSM 202 transmits the message to either a DCR FSM 204 or an arbiter 206 based on the determined destination. If the message is directed toward the PowerPC processor 110 of FIG. 1, the TL-C request FSM 202 transmits the message to the DCR FSM 204. The DCR FSM 204 translates the message to a message compatible with a DCR protocol. The DCR FSM 204 then transmits the translated message to the PowerPC processor 110 of FIG. 1 via the third bus 118 of FIG. 1, which implements the DCR protocol. For example, the DCR FSM 204 can access a table of states, in which each listed state is associated with a DCR compatible message. The DCR FSM 204 can compare an outputted state with a matching entry in the table and retrieve the DCR compatible message.

If, however, the message is directed toward the second L2 cache 112 of the PowerPC 108 of FIG. 1, the TL-C request FSM 202 transmits the message to the arbiter 206. The arbiter 206 determines the ownership of the second bus 116 and an order by which computing element 102 of FIG. 1 receives the data. In some embodiments of the present invention, the arbiter 206 is a round-robin arbiter, which determines a priority of the request, weights the request based on the priority, and provides access to the data in a round-robin fashion based on the weight. When a message is scheduled to be transmitted, the arbiter 206 transmits the message to a PLB write FSM 208. The PLB write FSM 208, applies the components of the input message as inputs, and outputs a message state. Based on the output state, the PLB write FSM 208 generates a message compatible with a PLB protocol. For example, the PLB write FSM 208 can access a table of states, in which each listed state is associated with a message compatible with the PLB protocol. The PLB write FSM 208 can compare the outputted state with a matching entry in the table and retrieve the associated PLB compatible message. The PLB write FSM 208 transmits the translated message to the PLB wrapper 232, which performs any final manipulation of the translated message necessary to make the message compatible with a PLB protocol. The PLB wrapper 232 transmits the translated message to the second L2 cache 112 of FIG. 1 via the second bus 116 of FIG. 1, which implements the PLB protocol.

A TL-C reply FSM 210 can receive an acknowledgment message from the PowerPC system 108 of FIG. 1 and transmit an acknowledgment to the computing element 102 of FIG. 1 via channel D of the first bus 114 of FIG. 1. The TL-C reply FSM 210 receives the components of the acknowledgment message and outputs an acknowledgment in a format that is acceptable to the bus protocol of computing element 102 of FIG. 1.

A TL-C release/data FSM 212 can transmit a response to a request from the PowerPC system 108 of FIG. 1. The TL-C release/data FSM 212 receives a response (e.g., data from the first L2 cache 106 of FIG. 1 via channel C of the first bus 114 of FIG. 1). The TL-C release/data FSM 212 receives the components of the response and outputs an opcode acceptable to a PLB protocol.

A TL-C Probe and Snoop Response FSM 214 acknowledges whether the first L2 cache 106 of FIG. 1 includes a requested cache block and also monitors transactions performed via channel C to maintain cache coherency. The TL-C Probe and Snoop Response FSM 214 is operable to receive a response from the computing element 102 of FIG. 1 indicating that the first L2 cache 106 of FIG. 1 has a cache block requested by the PowerPC system 108 of FIG. 1. The TL-C Probe and Snoop Response FSM 214 translates an acknowledgment into a code acceptable to the bus protocol of the PowerPC processor 110 of FIG. 1 and transmits the response to the arbiter 206. The TL-C Probe and Snoop Response FSM 214 also monitors data packets transmitted via channel C and further determines whether any of the data packets contain data stored in a shared cache that has been changed. The TL-C Probe and Snoop Response FSM 214 then determines if the data in each of shared caches has been changed such that each cache block has the same data values. To ensure coherency, the TL-C Probe and Snoop Response FSM 214 can initiate a flush or invalidation operation against a cache block via the TL-C Snoop Command Request FSM 216. For example, if data stored in the first L2 cache 106 of FIG. 1 is changed, the TL-C Probe and Snoop Response FSM 214 can cause the TL-C Snoop Command Request FSM 216 to issue a flush operation to the second L2 cache 112 of the PowerPC 108 of FIG. 1 to maintain cache coherency.

The TL-C Snoop Probe FSM 218 is operable to receive a request to access a cache block stored at the first L2 cache 106 of FIG. 1 from the PowerPC system 108 of FIG. 1. TL-C Snoop Probe FSM 218 translates the request into a probe operation acceptable to channel C of the first bus 114. The probe operation determines whether the first L2 cache 106 of FIG. 1 includes the requested cache block. An acknowledgment to the probe is sent back to the PowerPC system 108 via the Grant Acknowledgment Logic 220. The TL-C Snoop Probe FSM 218 can use channel C of the first bus 114 of FIG. 1 to transmit and receive various request-related signals including, but not limited to probes.

The system 100 can accommodate synchronous communication and asynchronous communication. Synchronous communication occurs when each of the processes participates at the point of communication. Asynchronous communication occurs when the processes are not required to participate at the point of communication. The system 100 can accommodate asynchronous messaging through a first in first (FIFO) unit. If the first process sends a message and the second message is not ready to receive the message, the FIFO unit places the message at the end of a queue. When the second process is ready to receive a message, it removes the first message from the queue and executes the message. The system 100 can include multiple FIFO units to perform these functions. As shown in the embodiment of FIG. 2, the system 100 can include a first FIFO unit 222 for placing and removing acknowledgments in a queue, a second FIFO unit 224 for placing and removing probe requests in a queue, a third FIFO unit 226 for placing and removing DCR read operations in a queue, and a fourth FIFO unit 228 for placing and removing PLB read operations in a queue.

The system 100 allows the computing element 102 of FIG. 1 to communicate with the second computing network 122 of FIG. 1 by resolving the incompatibility between the bus protocols. In some embodiments of the present invention, the first computing system 120 of FIG. 1 is an open source-based computing system, and the second computing system 122 of FIG. 1 is a server that employs proprietary hardware and software. An open source computing system is a computer hardware and software system, in which developers can design and manufacture compatible hardware and software without a license. In contrast, proprietary hardware and software can require a license to manufacture compatible hardware and software. In some instances, this communication can enhance the computing performance and acceleration of the second computing system 122 of FIG. 1. For example, the second computing system 122 of FIG. 1 can offload a workload to the first computing system 120 when an open source processor of the first computing system 120 of FIG. 1 is more efficient at executing the workload than the second computing system 122 of FIG. 1.

Figure 3:
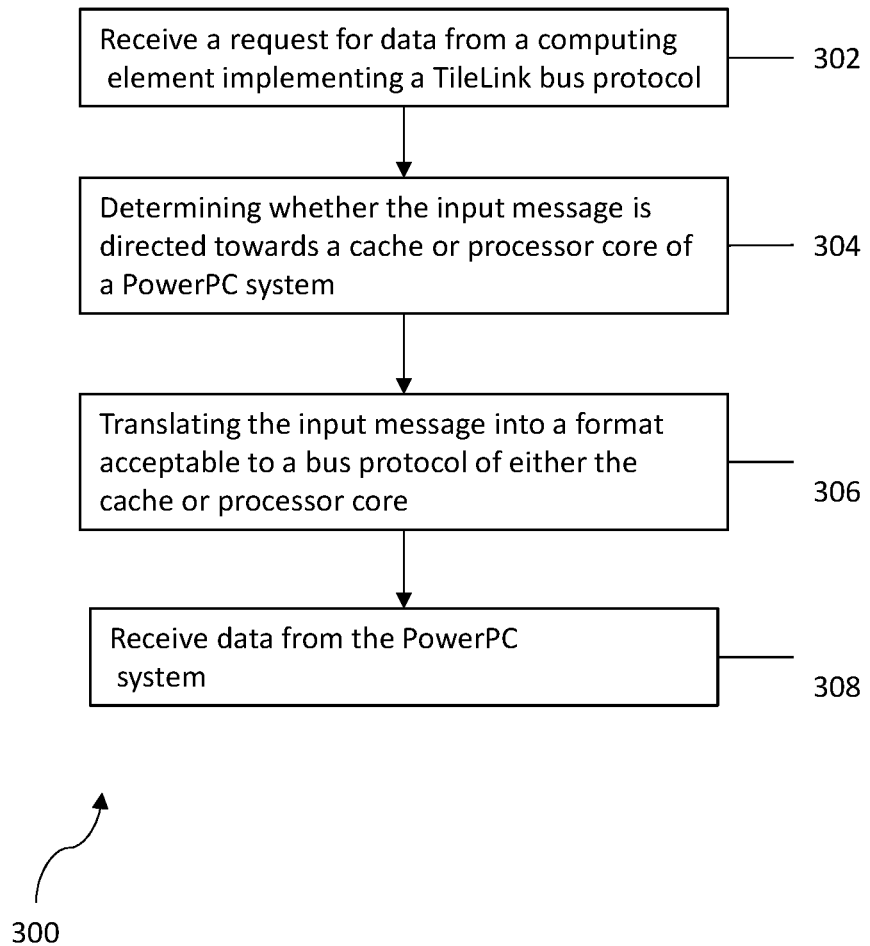
FIG. 3 illustrates a flow diagram of a process for substitution through a protocol to protocol bus translation in accordance with one or more embodiments of the present invention.

Referring to FIG. 3, a flow diagram of a process for substitution through a protocol to protocol bus translation in accordance with one or more embodiments of the present invention is shown. It should be appreciated that all or a portion of the processing shown in FIG. 3 can be performed by a computer system, such as system 100. At block 302, a TL-C request FSM 202 receives a request for data from a computing element 102 implementing a TileLink protocol. The computing element 102 can transmit the request via channel A of a first bus 114 implementing a TileLink protocol. The request can be for data stored in a second L2 cache 112 of a PowerPC system 108. The computing element 102 can request the data from the second L2 cache 112 for the purpose of executing an instruction set.

The decision to engage the computing element 102 to execute an instruction set can be based at least in part on whether executing the instructions is more efficient on PowerPC system 108 or on an open source environment offered by the computing element 102. In some instances, a set of instructions is more efficiently executed in an open source environment offered by the computing element 102 than on a PowerPC system 108. An example of a metric to determine efficiency is a workload, which includes the amount of work performed by a computing device in a given amount of time. For example, a memory workload is the amount of memory used by a system over a given period of time. A central processing unit (CPU) workload is the amount of instructions executed over a given period of time. An input/output (I/O) workload is the amount of received input and generated output over a given period of time. A database workload is based on various factors, including memory usage, I/O throughput, and other database-related factors over a given period of time.

In accordance with one or more embodiments of the present invention, a monitor unit 230 that is part of or is coupled to system 100 is in operable communication with the PowerPC processor 110 and can monitor an instruction set received by the PowerPC system 108. An instruction set includes instructions that can be logically grouped together, for example, based on a common purpose, job, and/or application. The monitor unit 230 can determine whether the instruction set is more efficiently executed in an open source environment or on the PowerPC system 108. For example, based on historical data, the system 100 can retrieve respective workloads associated with the set of instructions being executed on the PowerPC system 108 and on the computing element 102. The monitor unit 230 compares each estimated workload associated with an instruction set with a respective threshold workload. If at least one estimated workload exceeds a respective threshold workload, the monitor unit 230 then determines whether the computing resources of the PowerPC system 108 would more efficiently be employed if the instruction set was executed in an open source environment of the computing element 102. The monitor unit 230 makes the determination based on a comparison of estimated workloads of the PowerPC system 108 and estimated workloads of the computing element 102. For example, if the monitor unit 230, based on the comparison, determines that at least one estimated workload of the PowerPC system 108 exceeds a respective estimated workload of the computing element 102, the monitor unit 230 can engage the computing element 102 to execute the instruction set. If, however, the monitor unit 230, based on the comparison, determines that no estimated workload of the PowerPC system 108 exceeds a respective estimated workload of the computing element 102, the monitor unit 230 does not engage the computing element 102 to execute the instruction set.

Referring back to FIG. 3, at block 304, the TL-C request FSM 202 determines whether the request is to be transmitted via either second bus 116 or a third bus 118 to a PowerPC processor 110. The second bus 116 can implement a PLB protocol and the third bus 118 can implement a DCR protocol. The TL-C request FSM 202 makes the determination by analyzing the incoming request message and detect the opcode. The opcode reveals whether the request is directed toward the PowerPC processor 110 and/or the second L2 cache 112 of the PowerPC 108. The PLB protocol is for communicating with the second L2 cache, 112 and the DCR protocol is for communicating with the PowerPC processor 110.

At block 306, either the DCR FSM 204 or the PLB write FSM 208 translates the request into a format acceptable to the DCR protocol or PLB protocol based on the determined destination of the message. The DCR FSM 204 or the PLB write FSM 208 can respectively receive the input message and output a code acceptable to a PLB protocol or a DCR protocol. The DCR FSM 204 or the PLB write FSM 208 transmit the message to the PowerPC processor 110 or to the second L2 cache 112 via the appropriate second bus 116 or third bus 118.

At block 308, the TL-C reply FSM 210 receives data from the PowerPC system 108 in response to the request. In response, the Grant Acknowledgment Unit (GrantAck) unit 220 transmits an acknowledgment of receipt of the data back to the PowerPC processor 110.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
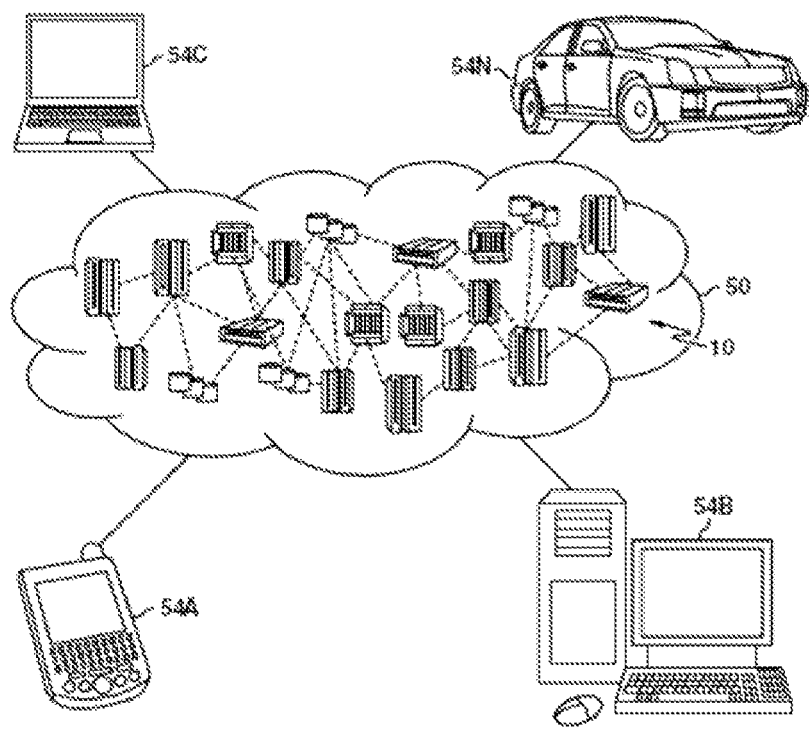
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
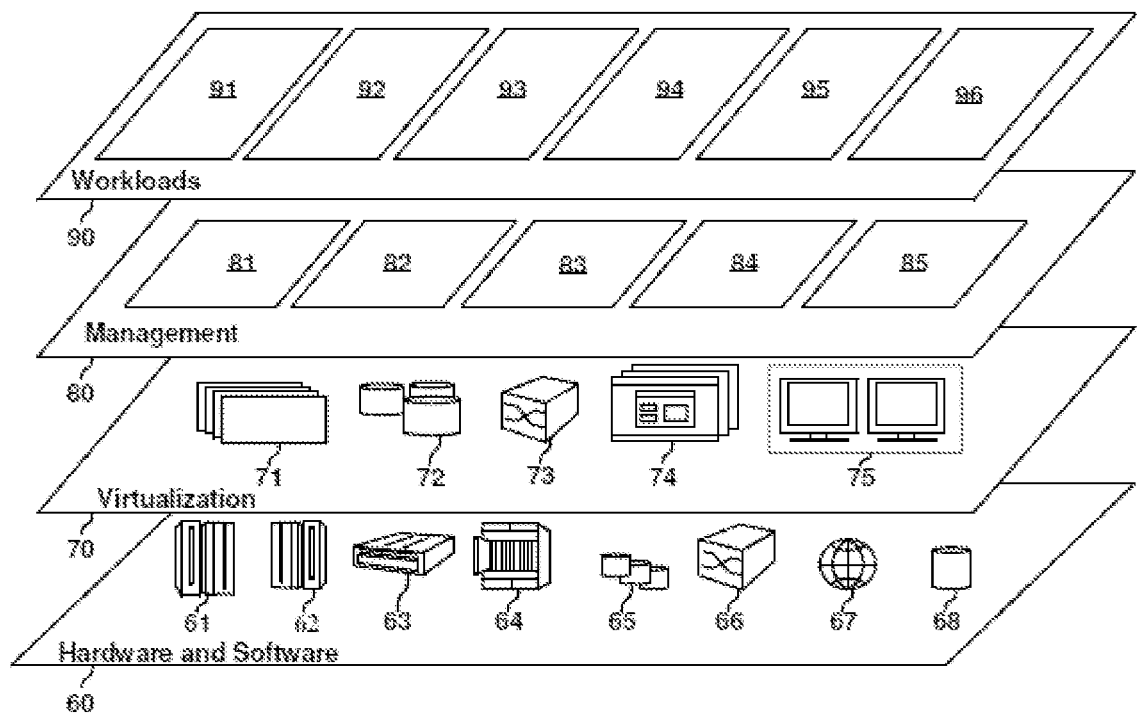
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and substitution of a PowerPC system by a computing element implementing a RISC instruction set architecture 96.

Figure 6:
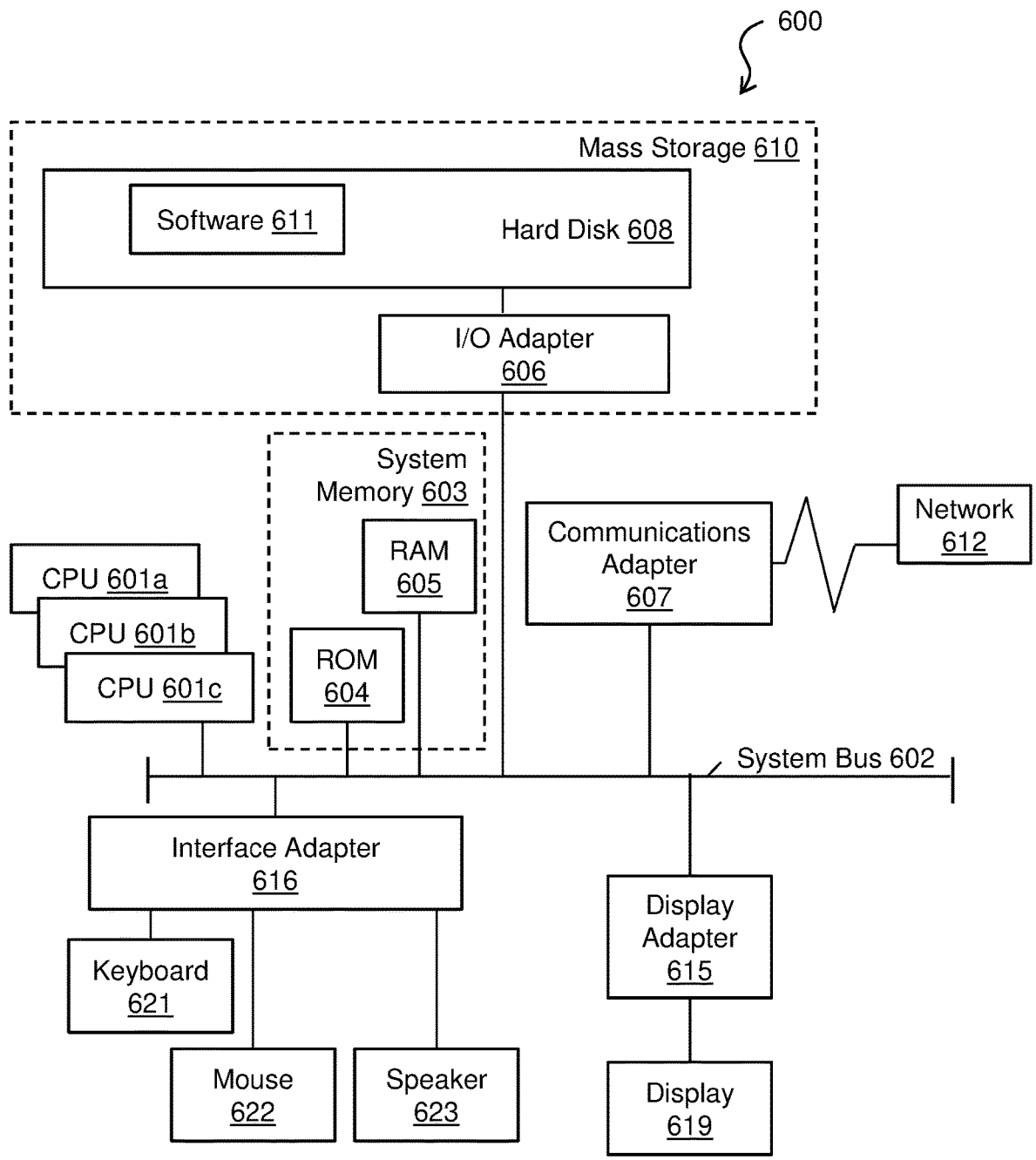
FIG. 6 illustrates a block diagram of a computer system for use in implementing one or more embodiments of the present invention.

In one or more embodiments of the present invention, the hardware/software modules in the system 100 from FIG. 1 can be implemented on the processing system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 503 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 516 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 503 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a request for data, the request comprising an opcode and received from a computing element implementing a first bus protocol, the data accessible via a reduced instruction set computer (RISC) system implementing a plurality of bus protocols;
   determining, by the processor, a type of the received request;
   selecting, by the processor, a bus protocol of the plurality of bus protocols, the selecting based at least in part on the type of the received request, the selecting comprising:
      determining whether the opcode is associated with an operation directed towards a cache of the RISC system or a processor core of the RISC system;
      selecting a second bus protocol based on determining that the opcode is associated with an operation directed towards a cache of the RISC system; and
      selecting a third bus protocol based on determining that the opcode is associated with an operation directed towards a processor core of the RISC system;
   translating, by the processor, the received request into a format that is compatible with the selected bus protocol;
   transmitting, by the processor, the translated request to the RISC system; and
   receiving, by the processor, the data from the RISC system in response to transmitting the translated request.

2. The computer-implemented method of claim 1, wherein the RISC system is a PowerPC system.

3. The computer-implemented method of claim 1, wherein the second bus protocol is a processor local bus (PLB) protocol and the third bus protocol is a device control register (DCR) protocol.

4. The computer-implemented method of claim 1, wherein translating the received request is performed by a finite state machine.

5. The computer-implemented method of claim 1, wherein the data is stored on a level two cache of the RISC system.

6. The computer-implemented method of claim 1 further comprising:
   detecting an instruction set received by the RISC system;
   determining an estimated workload of the RISC system executing the received instruction set;
   comparing the estimated workload to a threshold estimated workload; and
   engaging the computing element to execute the received instruction set based at least in part on the comparison between the estimated workload and the threshold estimated workload, wherein at least a subset of the received data is utilized to execute the received instruction set.

7. A system comprising:
   a memory having computer readable instructions; and
   one or more processors for executing the computer readable instructions, the computer readable instructions controlling the one or more processors to perform operations comprising:
   receiving a request for data, the request comprising an opcode and received from a computing element implementing a first bus protocol, the data accessible via a reduced instruction set computer (RISC) system implementing a plurality of bus protocols;
   determining a type of the received request;
   selecting a bus protocol of the plurality of bus protocols, the selecting based at least in part on the type of the received request, the selecting comprising:
      determining whether the opcode is associated with an operation directed towards a cache of the RISC system or a processor core of the RISC system;
      selecting a second bus protocol based on determining that the opcode is associated with an operation directed towards a cache of the RISC system; and
      selecting a third bus protocol based on determining that the opcode is associated with an operation directed towards a processor core of the RISC system;
   translating the received request into a format that is compatible with the selected bus protocol;
   transmitting the translated request to the RISC system; and
   receiving the data from the RISC system in response to transmitting the translated request.

8. The system of claim 7, wherein the RISC system is a PowerPC system.

9. The system of claim 7, wherein the second bus protocol is a processor local bus (PLB) protocol and the third bus protocol is a device control register (DCR) protocol.

10. The system of claim 7, wherein translating the received request is performed by a finite state machine.

11. The system of claim 7, wherein the data is stored on a level two cache of the RISC system.

12. The system of claim 7, wherein the operations further comprise:

detecting an instruction set received by the RISC system;

determining an estimated workload of the RISC system executing the received instruction set;

comparing the estimated workload to a threshold estimated workload; and engaging the computing element to execute the received instruction set based at least in part on the comparison between the estimated workload and the threshold estimated workload, wherein at least a subset of the received data is utilized to execute the received instruction set.

13. A computer program product comprising a computer readable storage medium having program instructions embodied therewith, the program instructions executable by a processor to cause the processor to perform operations comprising:

receiving a request for data, the request comprising an opcode and received from a computing element implementing a first bus protocol, the data is accessible via a reduced instruction set computer (RISC) system implementing a plurality of bus protocols;

determining a type of the received request;

selecting a bus protocol of the plurality of bus protocols, the selecting based at least in part on the type of the received request, the selecting comprising:

determining whether the opcode is associated with an operation directed towards a cache of the RISC system or a processor core of the RISC system;

selecting a second bus protocol based on determining that the opcode is associated with an operation directed towards a cache of the RISC system; and selecting a third bus protocol based on determining that the opcode is associated with an operation directed towards a processor core of the RISC system;

translating the received request into a format that is compatible with the selected bus protocol;

transmitting the translated request to the RISC system; and receiving the data from the RISC system in response to transmitting the translated request.

14. The computer program product of claim 13, wherein the RISC system is a PowerPC system.

15. The computer program product of claim 13, wherein the second bus protocol is a processor local bus (PLB) protocol and the third bus protocol is a device control register (DCR) protocol.

16. The computer program product of claim 13, wherein translating the received request is performed by a finite state machine.

17. The computer program product of claim 13, wherein the data is stored on a level two cache of the RISC system.

* * * * *